May 19, 1953     W. R. WALKER     2,638,927
FLUID ACTUATED VALVE
Filed April 6, 1948
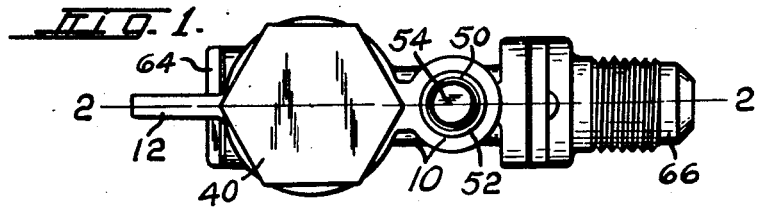
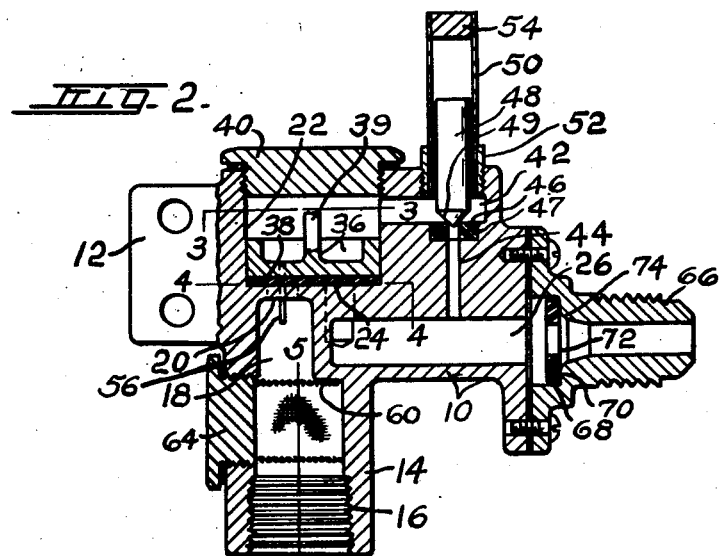
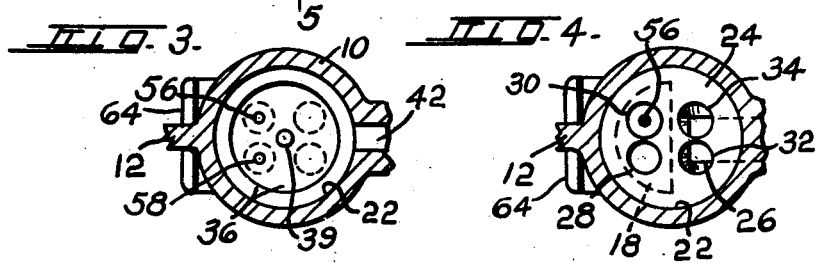
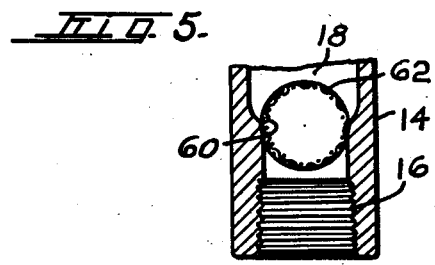
INVENTOR
WILLARD R. WALKER
BY *F. P. Keiper*
ATTORNEY Patented May 19, 1953

2,638,927

UNITED STATES PATENT OFFICE 2,638,927

FLUID ACTUATED VALVE

Willard R. Walker, Syracuse, N. Y., assignor to Easy Washing Machine Corporation, Syracuse, N. Y., a corporation of Delaware Application April 6, 1948, Serial No. 19,389

3 Claims. (Cl. 137—670)

This invention relates to valves, and more particularly to a fluid pressure actuated valve electrically or otherwise controllable.

In valves generally, the force required to seat or unseat the valve, depending upon the construction employed, is ordinarily considerable, since the structure of the valve is such as to make it necessary to overcome the fluid pressure. Where the valve seat is of extended area so as to permit relatively free flow of liquid therethrough when open, the pressure areas involved increase and the required valve actuating force correspondingly increases.

An object of the present invention is to provide a valve in which the pressure of the fluid is employed to actuate the valve in both directions, the valve being so constructed that the pressures present for valve actuation may be controlled by an electrically operated pilot valve. The construction is such as to provide a highly sensitive valve requiring a minimum of valve operating force. The valve accordingly is readily adapted to actuation by an external valve actuating solenoid or other actuating means, with the actuating mechanism completely sealed and enclosed against leakage. Valve stems and packing therefor are completely eliminated.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top plan view of the valve;

Figure 2 is a section taken through the valve substantially on the line 2—2 of Figure 1;

Figure 3 is a section taken through the piston chamber substantially on the line 3—3 of Figure 2;

Figure 4 is a section taken above the valve seat substantially on the line 4—4 of Figure 2; and Figure 5 is a section taken through the inlet filter screen substantially on the line 5—5 of Figure 2.

Referring to the drawings, there is shown a main valve body portion 10 which may be a casting of suitable metal such as brass or bronze or die cast material, the same being provided with an attachment ear 12 and an integral inlet extension 14. The inlet extension 14 is internally threaded as at 16 and hollowed out to form a conduit 18 terminating at a substantially horizontal valve seat partition 20. Extending inwardly from the top of the body oppositely to the inlet conduit is a cylindrical piston chamber 22 terminating at the bottom in a smooth valve seat 24. Extending inwardly from the side of the body is an outlet conduit 26 terminating beneath the valve seat 24. The valve seat 24 is provided with a pair of inlet ports 28 and 30 passing through the partition 20, and a pair of outlet ports 32 and 34 extending downwardly from the seat to the inner end of the outlet conduit 26.

The cylinder 22 contains a piston 36 having a valve pad 38 of rubber-like material adapted to bear against the seat 24 and thereby cover the ports 28, 30, 32 and 34 when the valve is in closed position. The cylinder 22 is capped by a screw plug 40, which coacts with a central stop 39 on the piston 36 to limit its upward movement. The upper end of the cylinder is connected by a bypass port 42 having a bleed connection 44 to the outlet conduit 26. The bleed connection extends substantially vertically and is provided at its upper end with a washer seat 46 of rubber-like material positioned in an annular recess 47, the aperture of which is in alignment with the bleed port 44. In axial alignment with the bleed port 44 and above the washer 46 is positioned a weighted valve element 48 having a conical valve face 49 adapted to engage the washer aperture and thereby interrupt flow of liquid through the bleed port 44. The element 48 is slidably mounted in a cylindrical shell 50 screw-threadedly held by a sleeve 52 in the body wall immediately above the bleed port 44. The cylindrical shell 50 may be of non-magnetic material such as brass, and may be plugged at the upper end as at 54. The element 48 may be of magnetic material so as to cooperate with a solenoid arranged around sleeve 50 and adapted to attract the magnetic element and lift the same within the sleeve 50 to unseat the valve face 49 from the apertured washer 46.

The piston 36 is provided with a small pin 56 adapted to extend downwardly through one of the inlet ports such as 30, the valve pad 38 being suitably pierced by such pin. Also, the piston is provided with an aperture 58 substantially in alignment with the other inlet port 28, there being provided in the pad 38 a similar aperture so that liquid under pressure in the inlet conduit 18 may flow through the piston and enter the cylinder 22. It will be observed that the pin 56 maintains the piston in proper orientation so that the port 58 is always in alignment with the inlet port 28.

It will be seen that by allowing fluid under pressure to pass through the piston by means of the restricted aperture 58 and enter the upper part of the cylinder 22, the piston 36 will be forced downward in engagement with the seat 24 and thereby interrupt the flow of fluid through the valve. This action results from the difference in area presented to the fluid under pressure above the piston as compared to the area of the inlet ports 28 and 30. The bleed port 44 is of sufficient size so that upon lifting the valve element 48, the fluid pressure above the piston and within the cylinder 22 will be reduced to an extent such that the pressure against the piston at the inlet ports 28 and 30 will be sufficient to unseat the valve pad 38. When this occurs, and the piston is slightly raised, the incoming fluid under pressure is permitted to act over the entire piston area, thereby quickly lifting the piston to the end of its upward stroke. Fluid is then free to pass from the inlet ports 28 and 30 to the outlet ports 32 and 34 to the outlet conduit 26.

When the bleed port 44 is closed by the valve element 48, the pressure within the cylinder above the piston again increases to substantially the pressure within the inlet conduit, and the pressure beneath the pad 38 is reduced by the flow conditions existing above the seat and particularly in the region above the outlet ports 32 and 34. The piston is thus caused to move downwardly choking off the flow beneath the pad from the inlet ports 28 and 30 to the outlet ports 32 and 34, while at the same time maintaining the upper part of the cylinder 22 in direct flow connection with the inlet conduit 18 through the aligned port 58.

Thus, through the simple, relatively light movement of the magnetic valve element 48 with respect to a valve seat of relatively reduced cross section, there is provided a valve actuation which is rapid and positive, acting under the force of hydrostatic pressure of the inlet conduit. The valve body may be provided with a filter screen 60 arranged in a transverse bore 62 extending across the inlet conduit 18, the screen being readily removable for inspection, cleaning and replacement by reason of the screw cap 64 which bears against one end of the screen and holds the same in place.

The outlet conduit may lead into a fluid pressure actuated constant flow valve in which a distortable ring of rubber-like material having an aperture therethrough acts to regulate the flow by aperture restriction in response to pressure. Such a pressure responsive constant flow device may be constituted by a nipple 66 secured to the side face of the body 10 and under the outlet conduit 26. The nipple is provided with an annular recess 68 having a seat 70 for the reception of a distortable ring 72 of rubber-like material. An internal annular shoulder 74, having a rounded profile, is adapted to permit the distortable washer 64 to tilt, dish, constrict or otherwise distort so as to decrease aperture diameter with an increase in pressure in the outlet conduit 26 behind the distortable member 72. The rounded profile protects the washer from cutting action. Such constant flow devices are well known and shown in the United States patent to Linstaedt, No. 2,188,366, issued January 30, 1940, and in British Patent 372,286, complete accepted May 2, 1932.

From the foregoing description, it will be apparent that there is provided a valve, the operation of which is readily controlled by electromagnetic operation, and in which the fluid passages are completely enclosed. It will also appear that the valve body with its passages, screen and the provision for constant flow outlet are so arranged as to be easily fabricated. At the same time, the various passages are readily accessible for inspection. At the same time, a valve having unusual restricted flow characteristics with quick opening and closing is provided.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a valve, a one-piece valve body portion having inlet and outlet port recesses arranged side by side and an opposed cylindrical walled expansible chamber recess, the last-named recess being separated from the inlet and outlet recesses by an integral partition forming a head for the expansible chamber recess, said partition having ports connecting said chamber to each of said inlet and outlet port recesses, and providing a flat valve seat upon the expansible chamber recess side of said partition, a flat valve member in the form of a piston movable in said expansible chamber recess and having a valve pad on one end adapted to engage said seat and seal both inlet and outlet ports, a port in said valve member and pad aligned with an inlet port in said seat, means forming a closure for said expansible chamber, and a valve controlled bypass interconnecting the outlet port recess with the expansible chamber recess at a point behind said member.

2. In a valve, a one-piece valve body portion having relatively straight inlet and outlet port recesses arranged side by side and an opposed expansible chamber cylindrically walled recess, the last-named recess being separated from the inlet and outlet recesses by an integral partition forming a cylinder head for the expansible chamber recess, said partition having ports connecting said chamber to each of said inlet and outlet port recesses, and providing a flat valve seat upon the expansible chamber side of said partition, a valve member in the form of a piston movable in said expansible chamber and having a seal in the form of a valve pad adapted to engage said seat and seal both inlet and outlet ports, a port in said valve member aligned with an inlet port in said seat, means forming a closure for said expansible chamber and a stop to limit movement of said member away from said seat, and a valve controlled bypass interconnecting the outlet port with the expansible chamber behind said member.

3. In a valve, a one-piece valve body portion having relatively straight inlet and outlet port recesses arranged side by side and an opposed expansible chamber cylindrically walled recess, the last-named recess being separated from the inlet and outlet recesses by an integral partition forming a cylinder head for the expansible chamber recess, said partition having ports connecting said chamber to each of said inlet and outlet port recesses, and providing a flat valve seat upon the expansible chamber side of said partition, a valve member in the form of a piston movable in said expansible chamber and having a seal in the form of a valve pad adapted to engage said seat and seal both inlet and outlet ports, a port in said valve member aligned with an inlet port in said seat, means forming a closure for said expansible chamber and a stop to limit movement of said member away from said seat, a valve-controlled bypass interconnecting the outlet port with the expansible chamber behind said chamber, and means for keying said piston against rotation to maintain said valve member port in alignment with said inlet port.

WILLARD R. WALKER.

References Cited in the file of this patent

UNITED STATES PATENTS

| Number | Name | Date |
|---|---|---|
| 848,739 | Gut | Apr. 2, 1907 |
| 1,005,703 | Goeddel | Oct. 10, 1911 |
| 1,730,150 | Keith | Oct. 1, 1929 |
| 1,891,547 | Krichbaum | Dec. 20, 1932 |
| 2,320,008 | Price | May 25, 1943 |
| 2,321,597 | Hobbs | June 15, 1943 |
| 2,426,900 | Parker | Sept. 2, 1947 |
| 2,466,375 | Carbon | Apr. 5, 1949 |
| 2,500,750 | Halenza | Mar. 14, 1950 |

FOREIGN PATENTS

| Number | Country | Date |
|---|---|---|
| 372,286 | Great Britain | May 2, 1932 |
| 622,204 | Great Britain | Apr. 28, 1949 |